United States Patent
Xi et al.

(10) Patent No.: US 10,522,847 B2
(45) Date of Patent: Dec. 31, 2019

(54) SEAL CONTACT PRESSURE UNIFORMITY BY INSERTING CONNECTION AT BEAD CORNERS

(71) Applicant: GM Global Technology Operations LLC, Detroit, MI (US)

(72) Inventors: Liang Xi, Northville, MI (US); Xi Yang, Bloomfield Hills, MI (US); Siguang Xu, Rochester Hills, MI (US); Ivan D. Chapman, Victor, NY (US)

(73) Assignee: GM Global Technology Operations LLC., Detroit, MI (US)

( * ) Notice: Subject to any disclaimer, the term of this patent is extended or adjusted under 35 U.S.C. 154(b) by 438 days.

(21) Appl. No.: 15/338,568

(22) Filed: Oct. 31, 2016

(65) Prior Publication Data
US 2018/0123142 A1    May 3, 2018

(51) Int. Cl.
| | | |
|---|---|---|
| *H01M 8/0202* | (2016.01) | |
| *H01M 8/0206* | (2016.01) | |
| *H01M 8/0271* | (2016.01) | |
| *H01M 8/0276* | (2016.01) | |
| *H01M 8/0247* | (2016.01) | |
| *H01M 8/0273* | (2016.01) | |

(52) U.S. Cl.
CPC ........ *H01M 8/0247* (2013.01); *H01M 8/0202* (2013.01); *H01M 8/0206* (2013.01); *H01M 8/0273* (2013.01); *H01M 8/0276* (2013.01)

(58) Field of Classification Search
CPC ............. H01M 8/0247; H01M 8/0202; H01M 8/0206; H01M 8/0271; H01M 8/0276
See application file for complete search history.

(56) References Cited

U.S. PATENT DOCUMENTS

2002/0055032 A1* 5/2002 Wakahoi ............. H01M 8/0247
                                                                429/509
2017/0324099 A1* 11/2017 Stoehr ..................... C25B 9/203

\* cited by examiner

*Primary Examiner* — Lisa S Park
(74) *Attorney, Agent, or Firm* — Quinn IP Law

(57) ABSTRACT

A number of variations may include a product that may include a fuel cell stack assembly that may include at least one bipolar plate including at least one first raised bead which may include a first split corner which may include a first connection.

13 Claims, 3 Drawing Sheets

SEAL CONTACT PRESSURE UNIFORMITY BY INSERTING CONNECTION AT BEAD CORNERS

TECHNICAL FIELD

The field to which the disclosure generally relates includes bipolar plates.

BACKGROUND

Fuel cells are electrochemical devices which combine a fuel such as hydrogen and an oxidant such as oxygen to produce electricity. The term fuel cell is typically used to refer to either a single cell or a plurality of cells depending upon the context in which it is used. The plurality of cells is typically bundled together and arranged to form a stack with the plurality of cells commonly arranged in electrical series.

In order to mitigate against undesirable leakage of fluids from between the plates, a seal is often used. The seal is disposed along a peripheral edge of the plates, and/or around a periphery of an aperture extending through the plates. The seal may include an elastomeric seal, or alternatively, the metal plates may be formed to define a raised bead seal. The raised bead may be formed on a planar metal sheet adjacent an outer edge of the sheet, or adjacent an edge surrounding an aperture formed in the sheet. The raised bead may be formed in the metal sheet by a stamping operation, although other methods may be used. The raised bead seal may be substantially symmetrical about a longitudinal center line of the raised bead seal. However, it should be appreciated that the raised bead seal may be non-symmetrical about the longitudinal center line. The raised bead seal may include a generally arcuate cross sectional shape perpendicular to the longitudinal center line. The generally arcuate cross sectional shape of the raised bead seal provides an elastic response to a load in a direction normal to the planar metal sheet.

The raised bead seal may be compressed against an adjoining plate to form a seal against the adjoining plate. If portions of the raised bead seal have a high stiffness, and others have a lower stiffness, the high stiffness areas of the raised bead seal may prevent the lower stiffness areas of the raised bead seal from forming a tight seal. Accordingly, the raised bead seals should have a uniform stiffness in all sections of the raised bead seal in order to form a tight seal around the entire peripheral edge of the plates and/or around the entire periphery of the adjacent aperture.

Sealing beads may militate against fluid leakage from adjacent plates within a fuel cell stack and facilitate flow of reactants within the fuel cell stack. Under extreme loads, for example a vehicle crash, the bead may become over-compressed and lead to leaking within a fuel cell or failure of the fuel cell stack. In particular, sealing beads may corners which may experience high contact pressure. Inclusion of connections at the corners of beads may reduce contact pressure.

SUMMARY OF ILLUSTRATIVE VARIATIONS

A number of variations may include a product that may include a fuel cell stack assembly that may include at least one bipolar plate including at least one first raised bead which may include a first split corner which may include a first connection.

A number of variations may include a product that may include at least one bipolar plate including at least one first raised bead which may include a first split corner which may include a first connection.

A number of variations may include a method which may include providing at least one bipolar plate including at least one first raised bead which may include a corner; and reducing contact pressure on the at least one first raised bead by providing a first split corner which may include a first connection within the corner.

Other illustrative variations within the scope of the invention will become apparent from the detailed description provided hereinafter. It should be understood that the detailed description and enumerated variations, while disclosing optional variations, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figure 1:
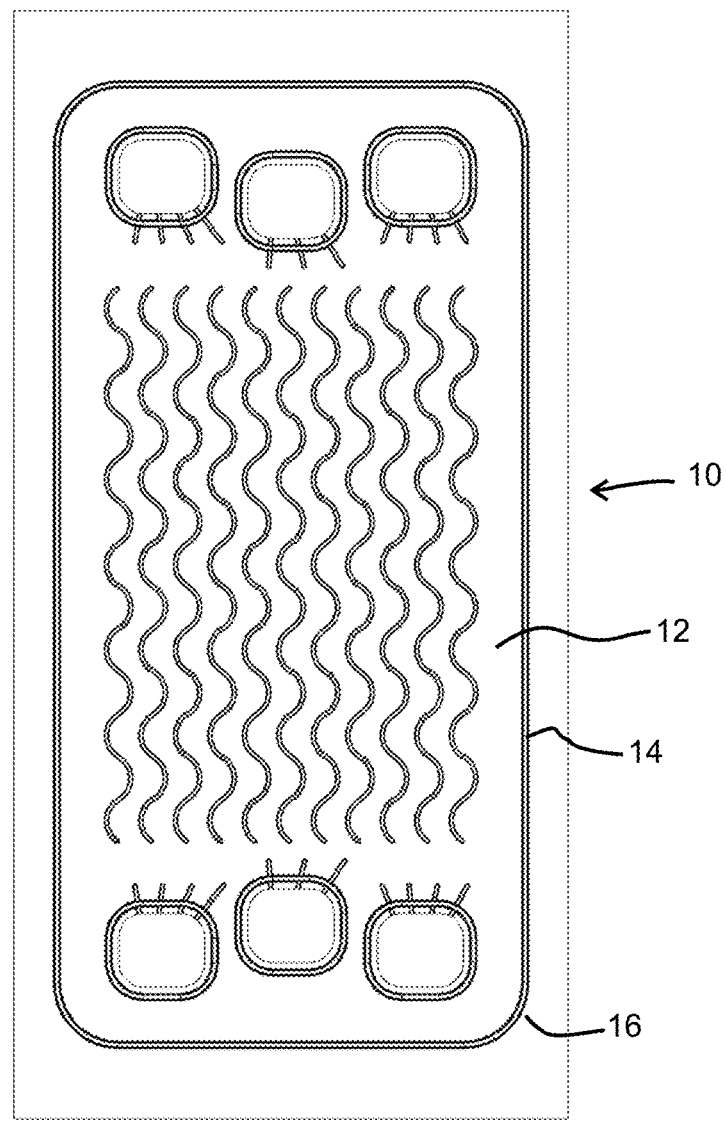
FIG. 1 depicts one variation of bipolar plate.
Figure 2:
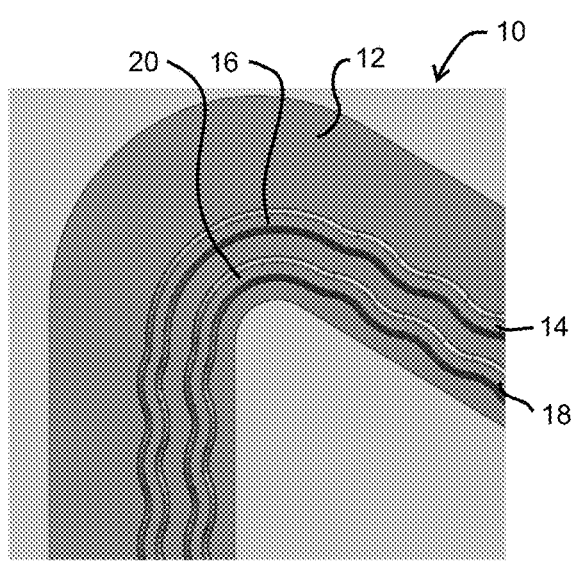
FIG. 2 depicts one variation of bipolar plate having raised beads.
Figure 3:
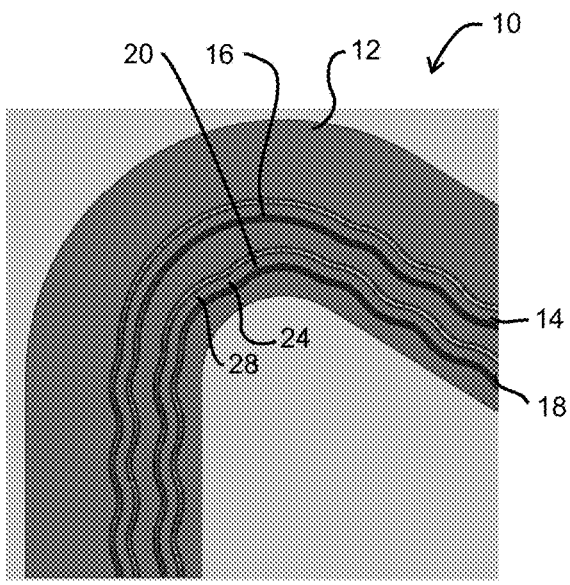
FIG. 3 depicts one variation of bipolar plate having raised beads.
Figure 4:
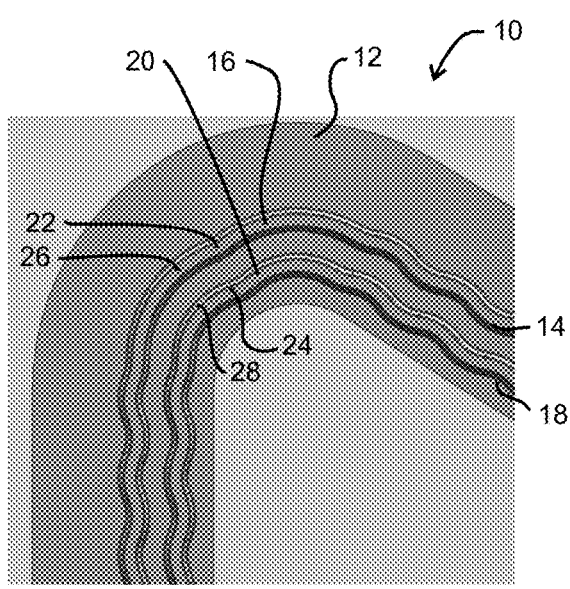
FIG. 4 depicts one variation of bipolar plate having raised beads.

The following description of the variations is merely illustrative in nature and is in no way intended to limit the scope of the invention, its application, or uses. The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and still are considered to be within the scope of the invention.

Referring to FIGS. 1-4; a fuel cell stack 10 may include at least one bipolar plate 12 which may include a first bead 14 and a second bead 18, wherein the first bead 14 and second bead 18 may be in parallel and wherein the first and second beads may be constructed and arranged to create a seal between the at least one bipolar plate 12 and an adjacent bipolar plate (not shown) within the fuel cell stack 10. The first bead 14 may include a first corner 16, and which may include a first connection 22 which may be constructed and arranged to split the first corner 16 into a first split corner 26 wherein the first split corner 26 is constructed and arranged to reduce bead contact pressure and improve uniformity of seal contact pressure along the seal path. The second bead 18 may include a second corner 20, and which may include a second connection 24 which may be constructed and arranged to split the second corner 20 into a second split corner 28 wherein the second split corner 28 is constructed and arranged to reduce bead contact pressure and improve uniformity of seal contact pressure along the seal path.

Figure 5:
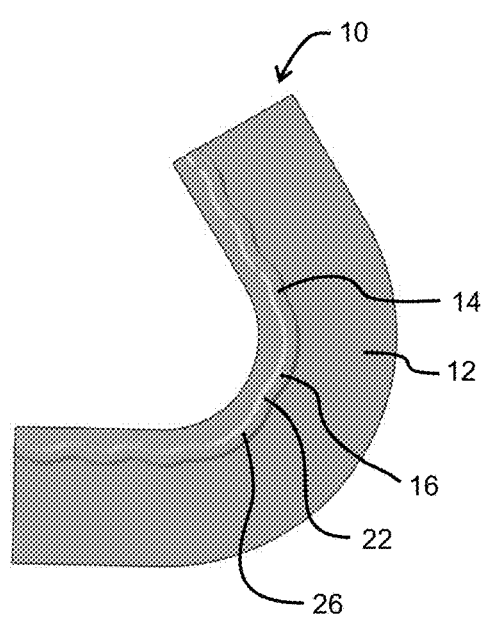
FIG. 5 depicts one variation of bipolar plate having a raised bead.

Referring to FIG. 5; a fuel cell stack 10 may include at least one bipolar plate 12 which may include a first bead 14 wherein the first bead 14 may be constructed and arranged to create a seal between the at least one bipolar plate 12 and an adjacent bipolar plate (not shown) within the fuel cell stack 10. The first bead 14 may include a first corner 16, and which may include a first connection 22 which may be constructed and arranged to split the first corner 16 into a first split corner 26 wherein the first split corner 26 is constructed and arranged to reduce bead contact pressure and improve uniformity of seal contact pressure along the seal path.

Figure 6:
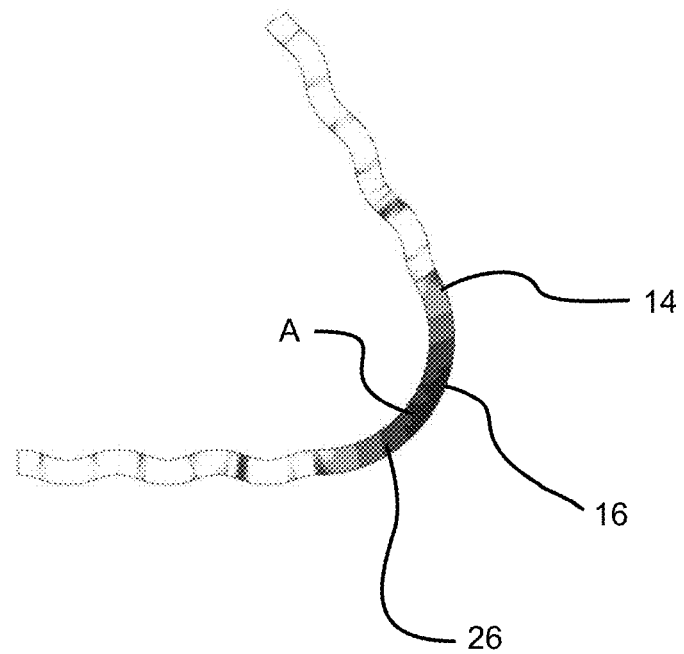
FIG. 6 depicts one variation of a finite elemental analysis of contact pressure measured at the corner of a raised bead of a bipolar plate.
Figure 7:
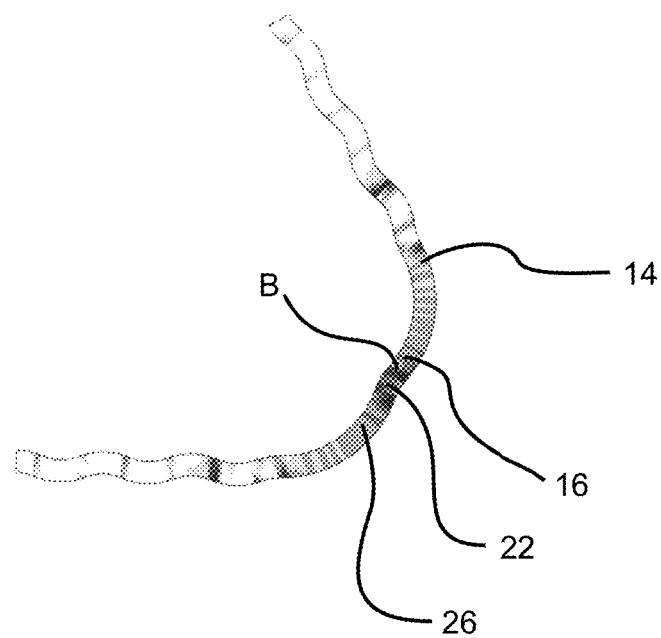
FIG. 7 depicts one variation of a finite elemental analysis of contact pressure measured at the corner of a raised bead of a bipolar plate.

Referring to FIGS. 6 and 7; and as an example, a bipolar plate including a sealing raised bead 14 including a corner 16 may have an average corner contact pressure (A) of approximately 3.13 MPa. A bipolar plate including a sealing raised bead 14 including a corner 16 which may include a connection 22 which may be constructed and arranged to split the corner into a split corner 26 may have an average corner contact pressure (B) of approximately 2.71 MPa, thereby reducing the bead contact pressure and improving uniformity of seal contact pressure along the seal path The above description is merely demonstrative in nature and, thus, variations thereof are not to be regarded as a departure from the spirit and scope of the inventions disclosed within this document.

According to variation 1, a product may include a fuel cell stack assembly that may include at least one bipolar plate including at least one first raised bead which may include a first split corner which may include a first connection.

Variation 2 may include a product as set forth in variation 1 and may further include a second raised bead which may include a second split corner which may include a second connection.

Variation 3 may include a product as set forth in any of variations 1 and 2 and may further include a second raised bead parallel to the at least one first raised bead.

Variation 4 may include a product as set forth in variations 3 wherein the second raised bead may include a second split corner may include a second connection.

According to variation 5, a product may include at least one bipolar plate including at least one first raised bead which may include a first split corner which may include a first connection.

Variation 6 may include a product as set forth in variation 5 and may further include a second raised bead which may include a second split corner which may include a second connection.

Variation 7 may include a product as set forth in any of variations 5 and 6 and may further include a second raised bead parallel to the at least one first raised bead.

Variation 8 may include a product as set forth in variation 7 wherein the second raised bead may include a second split corner may include a second connection.

According to variation 9, a method may include providing at least one bipolar plate including at least one first raised bead may include a corner; and reducing contact pressure on the at least one first raised bead by providing a first split corner may include a first connection within the corner.

Variation 10 may include a method as set forth in variation 9 wherein the at least one bipolar plate may further include a second raised bead which may include a second split corner which may include a second connection.

Variation 11 may include a method as set forth in variations 10 and 11 wherein the at least one bipolar plate may further include a second raised bead parallel to the at least one first raised bead.

Variation 12 may include a method as set forth in variation 11 wherein the second raised bead may include a second split corner which may include a second connection.

The above description of variations of the invention is merely demonstrative in nature and, thus, variations thereof are not to be regarded as a departure from the spirit and scope of the inventions disclosed within this document.

What is claimed is:

1. A product comprising:
a fuel cell stack assembly comprising at least one bipolar plate including a first raised bead, and a second raised bead disposed in parallel with the first raised bead, wherein the first and second raised beads are formed in the at least one bipolar plate;
wherein the first raised bead includes a first corner portion that is disposed on a corner of the bipolar plate, wherein the first corner portion of the first raised bead includes a first concave portion, a first convex portion, and a second concave portion that are disposed in a planar orientation relative to the bipolar plate;
wherein the first convex portion of the first raised bead is disposed on an arc that is defined at a cornermost portion of a vertex that is defined by the bipolar plate;
wherein the second raised bead includes a second corner portion that includes a third concave portion, a second convex portion, and a fourth concave portion; and
wherein the second convex portion of the second raised bead is disposed on the arc that is defined at the cornermost portion of the vertex that is defined by the bipolar plate.

2. A product comprising:
a fuel cell stack assembly comprising first and second bipolar plates, including a first raised bead, and a second raised bead disposed in parallel with the first raised bead, wherein the first and second raised beads are formed in the first bipolar plate and are formed in the second bipolar plate;
wherein the first raised bead includes a first corner portion that is disposed on a corner of the first bipolar plate, wherein the first corner portion of the first raised bead includes a first concave portion, a first convex portion, and a second concave portion;
wherein the first convex portion of the first raised bead is disposed on an arc that is defined at a cornermost portion of a vertex that is defined by the bipolar plate;
wherein the second raised bead includes a second corner portion that includes a third concave portion, a second convex portion, and a fourth concave portion;
wherein the first and second raised beads are arranged to effect a uniform seal contact pressure between the first and second bipolar plates; and
wherein the second convex portion of the second raised bead is disposed on the arc that is defined at the cornermost portion of the vertex that is defined by the bipolar plate.

3. A method comprising:
providing at least one bipolar plate including at least one first raised bead comprising a corner; and
reducing contact pressure on the at least one first raised bead by providing a first split corner comprising a first connection within the corner;

wherein the first split corner of the first raised bead includes a first concave portion, a first convex portion, and a second concave portion; and wherein the first convex portion of the first raised bead is disposed on an arc that is defined at a cornermost portion of a vertex that is defined by the bipolar plate.

4. A method as set forth in claim 3 wherein the at least one bipolar plate further comprises a second raised bead comprising a second split corner comprising a second connection.

5. A method as set forth in claim 3, wherein the at least one bipolar plate further comprises a second raised bead parallel to the at least one first raised bead;

wherein the second raised bead includes a second corner portion that includes a third concave portion, a second convex portion, and a fourth concave portion; and wherein the second convex portion of the second raised bead is disposed on the arc that is defined at the cornermost portion of the vertex that is defined by the bipolar plate.

6. A method as set forth in claim 5 wherein the second raised bead comprises a second split corner comprising a second connection.

7. A product as set forth in claim 1, wherein the first raised bead has an arcuate cross-section.

8. A product as set forth in claim 1, wherein the first raised bead is disposed along a peripheral edge of the bipolar plate.

9. A product as set forth in claim 1, further comprising a second bipolar plate disposed adjacent to the at least one bipolar plate, wherein the first raised bead is constructed to create a seal between the at least one bipolar plate and the second bipolar plate.

10. A product as set forth in claim 9, wherein the first corner portion of the first raised bead and the second corner portion of the second raised bead are constructed to provide uniformity of seal contact pressure along the seal between the at least one bipolar plate and the second bipolar plate.

11. A product as set forth in claim 1, wherein the first corner portion of the first raised bead is constructed to provide uniformity of seal contact pressure along a seal path defined by the first raised bead.

12. A product as set forth in claim 1, further comprising a second bipolar plate disposed adjacent to the first bipolar plate, wherein the first raised bead and the second raised bead are constructed to create a seal between the first bipolar plate and the second bipolar plate.

13. A product as set forth in claim 1, further comprising a second bipolar plate disposed adjacent to the first bipolar plate, wherein the first corner portion of the first raised bead and the second corner portion of the second raised bead are constructed to provide uniformity of seal contact pressure along a seal path defined by the first and second raised beads.

* * * * *